United States Patent
Dymshyts et al.

(10) Patent No.: US 9,998,599 B2
(45) Date of Patent: *Jun. 12, 2018

(54) VIRTUAL INTERACTIONS IN CONTACT CENTER OPERATIONS

(71) Applicant: GENESYS TELECOMMUNICATIONS LABORATORIES, INC., Daly City, CA (US)

(72) Inventors: Vadim Dymshyts, Pacifica, CA (US); Vidas Placiakis, Walnut Creek, CA (US); Nikolay I. Korolev, Concord, CA (US); Herbert Willi Artur Ristock, Walnut Creek, CA (US)

(73) Assignee: GENESYS TELECOMMUNICATIONS LABORATORIES, INC., Daly City, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/457,761

(22) Filed: Mar. 13, 2017

(65) Prior Publication Data

US 2018/0027116 A1 Jan. 25, 2018

Related U.S. Application Data

(63) Continuation of application No. 15/216,622, filed on Jul. 21, 2016, now Pat. No. 9,596,350.

(51) Int. Cl.
*H04M 3/00* (2006.01)
*H04M 5/00* (2006.01)
(Continued)

(52) U.S. Cl.
CPC ...... *H04M 3/5183* (2013.01); *H04L 12/2801* (2013.01); *H04L 67/02* (2013.01);
(Continued)

(58) Field of Classification Search
CPC .. G10L 15/00; G06Q 10/06; G06Q 10/06316; G06Q 30/016; H04L 51/02;
(Continued)

(56) References Cited

U.S. PATENT DOCUMENTS 7,680,752 B1 * 3/2010 Clune, III ............. G06Q 10/06
706/45
9,559,993 B2 * 1/2017 Palakovich
(Continued)

FOREIGN PATENT DOCUMENTS

KR 1020120025490 A 3/2012

OTHER PUBLICATIONS

International Search Report and Written Opinion for Application No. PCT/US2017/043102, dated Oct. 27, 2017, 12 pages.

*Primary Examiner* — Khai N Nguyen
(74) *Attorney, Agent, or Firm* — Lewis Roca Rothgerber Christie LLP

(57) ABSTRACT

A contact center has channels for receiving communications requesting interaction with an agent, agent stations providing connection ability to received communications, and a Virtual Interaction (VI) Server connected to the LAN and executing VI software on a processor from a non-transitory medium. The VI Server creates and stores a Virtual Interaction object based on determination of an expected receipt of a future communication, the VI associating a source, an intent, a set of data regarding the source, and an agent station destination, and the created VI is stored and matched with a real incoming communication from the source associated in the VI, and the VI is then instantiated as a live interaction by connecting the source of the incoming call with the agent destination associated in the VI.

18 Claims, 5 Drawing Sheets

(51) Int. Cl.
  *H04M 3/51* (2006.01)
  *H04L 29/08* (2006.01)
  *H04L 12/28* (2006.01)
  *H04M 3/523* (2006.01)

(52) U.S. Cl.
  CPC ............ *H04L 67/22* (2013.01); *H04L 67/306* (2013.01); *H04M 3/5175* (2013.01); *H04M 3/5238* (2013.01); *H04M 2203/403* (2013.01)

(58) Field of Classification Search
  CPC ...... H04L 51/046; H04L 51/24; H04M 3/323; H04M 3/36; H04M 3/4217; H04M 3/4285; H04M 3/42195; H04M 3/493; H04M 3/4931; H04M 3/4933; H04M 3/4935; H04M 3/4936; H04M 3/4938; H04M 3/42221; H04M 3/51; H04M 3/5158; H04M 3/5166; H04M 3/5175; H04M 3/5183; H04M 3/5191; H04M 3/523; H04M 3/5231; H04M 3/5232; H04M 3/5233; H04M 3/5235; H04M 3/5237; H04M 3/5238; H04M 3/54; H04M 2203/40; H04M 2203/401; H04M 2203/402; H04M 2203/403; H04M 2203/404; H04M 2203/405; H04M 2203/406; H04M 2203/407408; H04M 2203/2011; H04M 2203/2061; H04M 2242/00; H04M 2242/08; H04M 2242/12
  USPC ........... 379/210.01, 265.01, 265.02, 265.03, 379/265.04, 265.05, 265.06, 265.07, 379/265.08, 265.09, 265.1, 265.11, 379/265.12, 265.13, 265.14, 266.01, 379/266.02, 266.03, 266.04, 266.05, 379/266.06, 266.07, 266.08, 266.09, 379/266.1
  See application file for complete search history.

(56) References Cited

U.S. PATENT DOCUMENTS

| | | | |
|---|---|---|---|
| 9,596,350 B1* | 3/2017 | Dymshyts | H04M 3/523 |
| 2003/0108183 A1* | 6/2003 | Dhir | H04M 3/493 |
| | | | 379/265.01 |
| 2004/0030596 A1* | 2/2004 | Attar | G06Q 30/02 |
| | | | 709/204 |
| 2013/0050199 A1* | 2/2013 | Chavez | G06Q 10/101 |
| | | | 345/419 |
| 2013/0051547 A1* | 2/2013 | Chavez | G06Q 10/101 |
| | | | 379/265.09 |
| 2013/0051548 A1* | 2/2013 | Chavez | G06Q 10/101 |
| | | | 379/265.09 |
| 2014/0244712 A1* | 8/2014 | Walters | H04L 67/10 |
| | | | 709/202 |
| 2014/0278678 A1* | 9/2014 | Malkin | G06Q 10/1095 |
| | | | 705/7.19 |
| 2014/0278718 A1* | 9/2014 | Malkin | G06Q 10/1095 |
| | | | 705/7.26 |
| 2015/0334238 A1* | 11/2015 | Williams | H04M 3/5231 |
| | | | 379/265.11 |
| 2016/0099892 A1* | 4/2016 | Palakovich | H04L 51/04 |
| | | | 709/206 |
| 2016/0275198 A1* | 9/2016 | Williams | G06F 17/30867 |
| 2016/0294952 A1* | 10/2016 | Bodell | G06Q 30/016 |

\* cited by examiner

VIRTUAL INTERACTIONS IN CONTACT CENTER OPERATIONS

CROSS-REFERENCE TO RELATED APPLICATIONS:

This application is a continuation of U.S. patent application Ser. No. 15/216,622, filed on Jul. 21, 2016, now U.S. Pat. No. 9,596,350, the content of which is incorporated herein by reference.

BACKGROUND

1. Field

The present invention is in the technology area of contact centers, and pertains more particularly to creation and use of virtual interactions.

2. Description of Related Art

In the art at the time of the filing of the instant patent application, contact centers developed for receiving and managing large volumes of calls for business enterprises are well-known. Examples are such centers operating for customers of banks, and for technical help for customers of enterprises that sell technical equipment.

In operation of such contact centers there may be a large volume of calls, and the call rate may vary by time and circumstance. Also in such contact centers, a central function is the process of determining intent of callers, and routing the incoming calls to individual ones of agents, who are typically manning agent stations connected over a Local Area Network (LAN). In this operation there are inevitably delays, and circumstances where all agents are engaged, and callers are put on hold until an agent becomes available.

In addition to the routing of calls, contact centers often have other functions, such as outgoing campaigns, activities of agents other than call handling, and much more. Modern contact centers have become very sophisticated operations in digital hardware and software. The sorts of problems encountered are well-known, and technologists are always at work developing new and unique solutions to the well-known problems. The present invention is a unique approach to alleviating the problems of contact centers.

BRIEF SUMMARY

In an embodiment of the invention a contact center is provided, comprising channels coupled to a local area network (LAN) for receiving communications requesting interaction with an agent, computerized agent stations connected to the LAN providing connection ability to received communications, and a Virtual Interaction (VI) Server connected to the LAN and executing VI software on a processor from a non-transitory medium. The VI Server creates and stores a VI object based on determination of an expected receipt of a future communication, the VI associating a source for the expected communication, an intent for the expected communication, a set of data regarding the source for the expected communication, and an agent station destination, and wherein the created VI is stored and matched with a real incoming communication from the source associated in the VI, and the VI is then instantiated as a live interaction by connecting the source of the incoming call with the agent destination associated in the VI.

In one embodiment time parameters are associated with created VIs, including time of creation, time of life, and time to expire. Also in one embodiment the contact center further comprises routing intelligence, wherein an agent station destination is determined by the routing intelligence for the VI at time of creation, and agent routing is repeated periodically until the VI matches an incoming communication and becomes a live interaction, or until the time to expire for the VI is reached. Also in one embodiment all VIs created are tracked and stored associated with data regarding results. And in one embodiment determination of expected receipt of a future communication is realized by interaction between a source and an agent, wherein the source indicates an intent for a future interaction, and the agent initiates creation of the VI as a result through functions of a desktop application executing at the agent workstation.

In one embodiment of the invention determination of expected receipt of a future communication is realized by tracking browsing behavior on a web site hosted by an enterprise hosting the contact center, wherein the VI server executing the VI software follows preset rules to trigger creation of the VI according to the tracked behavior. Also in one embodiment the VI server creates a VI in response to a source communication indicating an intent to initiate a communication for a stated intent at a particular time. Also in one embodiment the source communication is input from a source to an interactive interface provided in a web site hosted by the enterprise hosting the contact center. IN one embodiment the VI server creates training VIs for training agents at agent stations, the training VIs connecting an agent with a pre-programmed source, which is an audio or video track presenting a pre-planned interaction between the pre-programmed source and the agent. And in one embodiment training VIs are utilized to teach new skills to agents.

In one embodiment training VIs are utilized to rate agents for performance in varied situations. In one embodiment data regarding customers of the enterprise hosting the contact center is stored in customer profiles, and wherein VIs are created, maintained and periodically updated for every customer having a profile, the VIs created comprising interchangeable intent, such that every communication arriving from a customer source is matched with a closest match VI for that customer, and the VI becomes a live interaction by connection to an agent. And in one embodiment communications from first time callers are matched to a closest match existing VI, the source is changed to match the new source, and a profile is created for the new customer.

In another aspect of the invention a method is provided, comprising creating and storing, by software executing on a processor of a Virtual Interaction (VI) Server of a contact center, a VI object based on determination of an expected receipt of a future communication in a channel coupled to a local area network (LAN) serving the contact center, the VI associating a source for the expected communication, an intent for the expected communication, a set of data regarding the source for the expected communication, and an agent station destination, among agent stations coupled to the LAN, matching the stored VI with an incoming communication from the source associated in the VI, and instantiating the VI as a live interaction by connecting the source of the incoming call with the agent station destination associated in the VI.

In one embodiment of the method time parameters are associated with created VIs, including time of creation, time of life, and time to expire. Also in one embodiment the method further comprises routing intelligence, and an agent station destination is determined by the routing intelligence for the VI at time of creation, and agent routing is repeated periodically until the VI matches an incoming communication and becomes a live interaction, or until the time to expire for the VI is reached. Also in one embodiment all VIs created are tracked and stored associated with data regarding results. IN one embodiment determination of expected receipt of a future communication is realized by interaction between a source and an agent, wherein the source indicates an intent for a future interaction, and the agent initiates creation of the VI as a result through functions of a desktop application executing at the agent workstation. And in one embodiment determination of expected receipt of a future communication is realized by tracking browsing behavior on a web site hosted by an enterprise hosting the contact center, wherein the VI server executing the VI software follows preset rules to trigger creation of the VI according to the tracked behavior.

In one embodiment of the method the VI server creates a VI in response to a source communication indicating an intent to initiate a communication for a stated intent at a particular time. Also in one embodiment the source communication is input from a source to an interactive interface provided in a web site hosted by the enterprise hosting the contact center. Also in one embodiment the VI server creates training VIs for training agents at agent stations, the training VIs connecting an agent with a pre-programmed source, which is an audio or video track presenting a pre-planned interaction between the pre-programmed source and the agent. In one embodiment training VIs are utilized to teach new skills to agents. In one embodiment training VIs are utilized to rate agents for performance in varied situations. In one embodiment data regarding customers of the enterprise hosting the contact center is stored in customer profiles, and wherein VIs are created, maintained and periodically updated for every customer having a profile, the VIs created comprising interchangeable intent, such that every communication arriving from a customer source is matched with a closet match VI for that customer, and the VI becomes a live interaction by connection to an agent. And in one embodiment communications from first time callers are matched to a closest match existing VI, the source is changed to match the new source, and a profile is created for the new customer.

DETAILED DESCRIPTION

System Architecture

Figure 1:
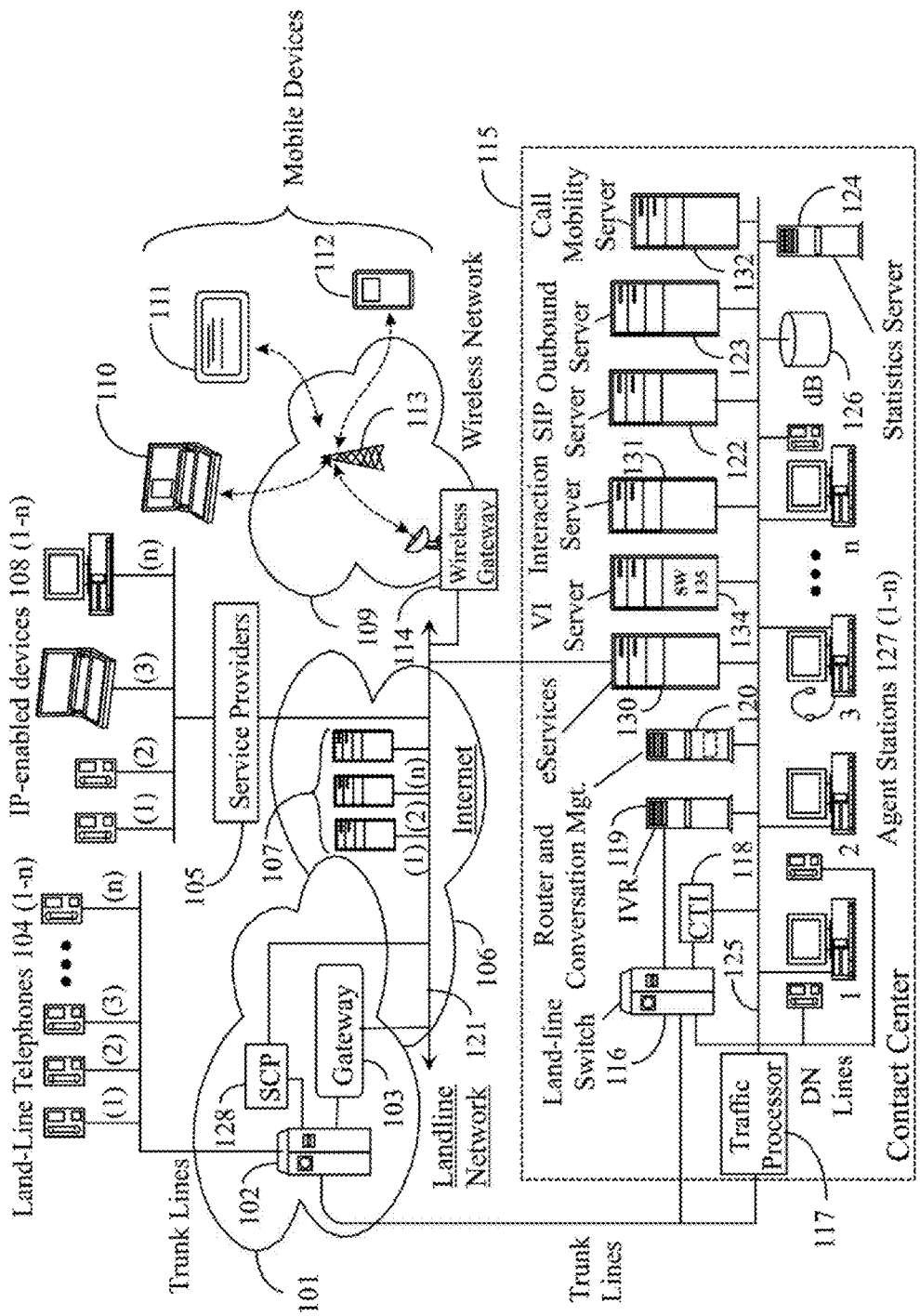
FIG. 1 is an architectural diagram depicting equipment and connectivity in one embodiment of the present invention.

FIG. 1 is a diagram illustrating a contact center 115 and a plurality of networks with interconnections whereby customers and remote agents may interact with agents and interactive functionality at the contact center. Contact center 115 may be hosted by one enterprise or by more than one enterprise, and one enterprise may employ more than one contact center. Customers and agents may interact with contact center 115 through communication appliances such as land-line telephones 104 (1-n), IP-enabled devices 108 (1-n), or through mobile appliances 110, 111 or 112. In some circumstances interaction may be limited to voice, but in other circumstances interaction may include text interaction, such as, for example, email, messaging services, chat, video interaction, data services, and so on.

Persons interacting through land-line telephones 104 may connect firstly over trunk lines as shown to a network switch 102. Switch 102 may interact with hardware and software of a Service Control Point (SCP) 128, which may execute intelligent operations to determine to connect an incoming call to different ones of available contact centers or to route an incoming call directly to an agent in a contact center or to an agent operating as a remote agent outside contact center premises. Incoming calls in some circumstances may also be routed through a gateway 103 into the well-known Internet network 106 as packet-switched calls. The interconnections in the Internet are represented by backbone 121. In this circumstance such a call may be further processed as a packet-switched IP call. Equipment providing SCP services may also connect to the Internet and may allow SCP functionality to be integrated with Internet-connected servers and intelligence at contact centers.

A call from a land-line telephone 104 connecting to switch 102 may be routed to contact center 115 via trunk lines as shown to either a land-line switch 116 in contact center 115 or to a Traffic Processor 117. A contact center 115 may operate with just one of the land-line switch or the traffic processor, but in some circumstances may employ both incoming paths. Traffic processor 117 may provide Session Border Control (SBC) functionality, may operate as a Media Gateway, or as a SoftSwitch.

Persons interacting through IP-enabled devices 108 (1-n) may interact through the Internet network via backbone 121, enabled by a variety of service providers 105 which operate to provide Internet service for such devices. Devices 108(1) and 108(2) may be IP-enabled telephones, operating under a protocol such as Session Initiation Protocol (SIP). Appliance 108(3) is illustrated as a lap-top computer, which may be enabled by software for voice communication over packet networks such as the Internet, and may also interact in many other ways, depending on installed and operable software, such as Skype™. Similarly, appliance 108(n) illustrated as a desktop computer, may interact over the Internet in much the same manner as laptop appliance 108(3).

Many IP-enabled devices provide capability for users to interact both in voice interactions and text interactions, such as email and text messaging services and protocols. Internet 106 may comprise a substantial variety of Internet-connected servers 107 and IP-enabled devices with Internet access may connect to individual ones of such servers to access services provided. Servers 107 in the Internet may comprise email servers, text messaging servers, social networking servers, Voice over IP (VoIP) servers, and many more, many of which users may leverage in interaction with a contact center such as contact center 115.

Another arrangement by which users and in some cases remote agents may interact with contact centers is through mobile devices, illustrated in FIG. 1 by devices 110, 11 and 112. Such devices may include, but are not limited to laptop computers, Pad devices and smart telephones. Such devices are not limited by a land-line connection or by a hard-wired Internet connection as shown for telephones 104 or IP-enabled devices 108, and may be used by customers and remote agents from changing geographic locations and while in motion. Devices 110, 111 and 112 are illustrated in FIG. 1 as connecting through a wireless network 109, which may occur through individual ones of cell towers 113 associated with base stations having gateways such as gateway 114 illustrated, the gateways connected to Internet backbone 121.

In some circumstances mobile devices, such as devices 110, 111 and 112 may connect to supplemental equipment operable in a moving vehicle. For example, cellular smartphones may be enabled for near-field communication such as Bluetooth™, and may be paired with equipment in an automobile, which may in turn connect to the Internet network through satellite equipment and services, such as On-Star™. Wireless communication may be provided as well in aircraft, which may provide an on-board base station, which may connect wirelessly to the Internet through either a series of ground stations over which an aircraft may pass in flight, or through one or more satellites.

Regardless of the variety of ways that Internet access may be attained by mobile devices, users of these devices may leverage Internet-connected servers for a great variety of services, or may connect through the Internet more directly to a contact center such as contact center 115, where users may interact as customers or as remote agents of the contact center.

Contact center 115, as described above, may represent one of a plurality of federated contact centers, a single center hosted by a single enterprise, a single contact center operating on behalf of a plurality of host enterprises, or any one of a variety of other arrangements. Architecture of an individual contact center 115 may also vary considerably, and not all variations may be illustrated in a single diagram such as FIG. 1. The architecture and interconnectivity illustrated in FIG. 1 is exemplary.

Equipment in a contact center such as contact center 115 may be interconnected through a local area network (LAN) 125. Land-line calls may arrive at a land-line switch 116 over trunk lines as shown from land-line network 101. There are a wide variety of land-line switches such as switch 116, and not all have the same functionality. Functionality may be enhanced by use of computer-telephony integration (CTI), which may be provided by a CTI server 118, which may note arriving calls, and may interact with other service units connected to LAN 125 to route the calls to agents connected to LAN 125, or in some circumstances may route calls to individual ones of remote agents who may be using any of land-line telephones 104, IP-enabled devices 108 or mobile devices represented by devices 110, 111 or 112. Calls may be queued in any one of a variety of ways before connection to an agent, either locally-based or remote from the contact center, depending on circumstances.

Incoming land-line calls to switch 116 may also be connected to an IVR server 119, which may serve to ascertain purpose of the caller and other information useful in further routing of the call to final connection. A universal router and/or conversation manager server 120 may be leveraged for routing intelligence, of which there may be a great variety, and for association of the instant call with previous calls or future calls that might be made. Call Mobility intelligence, and server execution of same, is described in additional detail in descriptions below.

Land-line calls thusly treated may be connected to agents at agent stations 127(1) or 127(2), each of which is shown as comprising a land-line telephone connected to switch 116 by destination number (DN) lines. Such calls may also be connected to remote agents using land-line telephones back through the land-line network. Such remote agents may also have computing appliances connected to contact center 115 for interaction with agent services such as scripting through an agent desktop application, also used by agents at agent stations 127.

Incoming calls from land-line network 101 may alternatively be connected in contact center 115 through Traffic Processor 117, described briefly above, to LAN 125. In some circumstances Traffic Processor 117 may convert incoming calls to SIP protocol, and such calls may be further managed by SIP Server 122 or traffic processor 117.

Incoming calls from IP-enabled devices 108 or from mobile devices 110, 111 or 112, and a wide variety of text-based electronic communications may come to contact center 115 through the Internet, arriving in the contact center at an eServices Connector 130. eServices Connector 130 operates as a server, and may provide protective functions, such as a firewall may provide in other architecture, and may serve to direct incoming transactions to appropriate service servers. For example, SIP calls may be directed to SIP Server 122 or to Traffic Processor 117, and text-based transactions may be directed to an Interaction Server 131, which may manage email, chat sessions, Short Message Service (SMS) transactions, co-browsing sessions, and more. Interaction Server 131 may leverage services of other servers in the contact center, and other servers available remotely as well.

Agent station 127(3) is illustrated as having a connected headset from a computing device, which may execute telephony software to interact with packet-switched calls. Agent station 127(n) is illustrated as having an IP-enabled telephone connected to LAN 125, through which an agent at that station may connect to packet-switched calls. Every agent station may have a computerized appliance executing software to enable the using agent to transact by voice, email, chat, instant messaging, and any other known communication process, including video and social media. The agent stations are also useful for back-office tasks, such as claim processing, for example, and for agent training.

The computerized appliance at an agent station may also execute an application known as a desktop application, through which an agent using the station may interact with and leverage many services available to enhance the agent's interactivity, both with callers, and with other services provided in the contact center.

A Statserver 124 is illustrated in contact center 115, connected to LAN 125, and may provide a variety of services to agents operating in the contact center, and in some circumstances to customers of the contact center. Statistics may be used in contact center management to vary functionality in routing intelligence, load management, and in many other ways. A dB 126 may be provided to archive data and to provide temporary storage for many of the activities in contact center 115. An outbound server 123 is illustrated and may be used to manage outbound campaigns in the contact center, wherein calls may be made to destinations from a campaign list, and answered calls may be connected directly or may be queued to be connected to agents involved in the outbound campaigns.

In one embodiment of the invention, in addition to other servers shown in contact center 115, there may additionally be a Call Mobility server 133 as shown in FIG. 1, connected to LAN 125. The functions of Call Mobility server 132 are to enable callers to move to different devices while a call is in progress, without having to re-establish a call. Further, in an embodiment of the present invention there may be a Virtual Interaction Server 134 connected to LAN 125, and this server may execute SW 135 for creating and managing virtual interactions, described in enabling detail below.

As described above, contact center 115, and the architecture and connectivity of the networks through which transaction is accomplished between customers and agents is exemplary, and there are a variety of ways that similar functionality might be attained with somewhat different architecture.

A very important function of every contact center operation is receiving communications from persons seeking a service provided by the enterprise, connecting that communication to a human or digital agent capable of providing the service sought, and completing the resulting transaction. For a contact center operating for a financial institution like a bank, for example, customers having an account at the bank may be calling to check the balance, move cash from one account to another, make a payment on a loan, initiate a mortgage application, and any of a variety of other services. For a car dealership, customers may be calling to arrange service and maintenance, establish a lease, buy a new car, and so on. For manufacturers of consumer computer equipment, customers may be calling to get guidance in setting up a computer station, guidance for installing software or troubleshooting operation, and so forth. It is almost universal in such operations that callers (customers) will not all have the same intent with a call. It is therefore mandatory in routing operations to determine the intent of a caller, to be able to best route the call to an agent that is capable to provide the service desired.

It is important to understand that the communications are in no way limited to voice calls. Modern contact centers handle voice calls, both land-line and voice-over-IP (VoIP), text messages, email, chat sessions, and literally any and all ways that customers and agents might interact. And because the purpose is interaction, an actual live communication event is often called an interaction in the art. This terminology is used in this patent specification.

Figure 2:
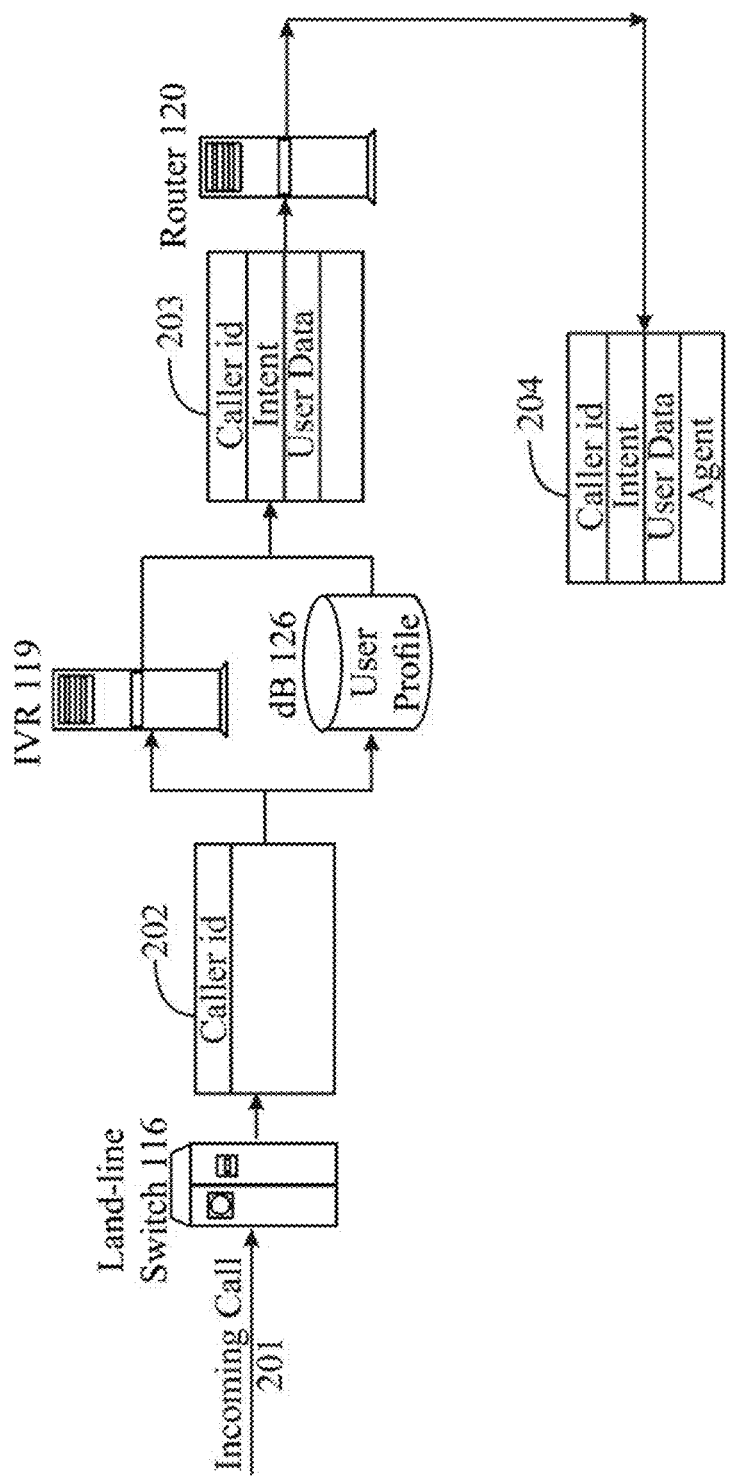
FIG. 2 is a simple diagram depicting development of an interaction in a contact center, and an object that represents a live interaction.

Persons skilled in software arts will understand that data entities upon which software processes may operate may be termed and considered as objects in a hardware/software system. FIG. 2 is a simple diagram depicting development of an interaction in a contact center, and an object 204 that represents a live interaction that is accomplished between a caller and an agent as a result of operation of functions of the contact center. This example assumes a voice call as the interaction, and a particular functional process in the contact center to establish a live interaction between the caller and an agent. The skilled person will understand that the process illustrated in FIG. 2 may be based on an interaction other than a voice call, such as a text message, that the process described is exemplary, and that the flow might take different paths.

In this example, the beginning of development of a live interaction object is receiving an interaction at the contact center. In this example the interaction is a voice call. In FIG. 2 the interaction is incoming call 201, which arrives at Land-Line switch 116 (see FIG. 1). The result is an incoming call object 202 associated with a caller id. In this example switch 202 connects the incoming call with IVR 119 to determine the caller's intent. At the same time, or in sequence, either before or after the IVR, the system may also access user profiles in dB 126 to access user data. Although connection to IVR 119 is illustrated, the user's intent may be determined in other ways known in the art. In this example the user's interaction with IVR 119 may be very quick and simple, or may be more involved. Further, the User data available may range from nothing (this may be a first-time caller) or there may be extensive useful data, which may be accessed and attached to the developing call object in a variety of ways for later use.

In any case, after the access of user data, and the interaction of the caller with the IVR, the call object may be developed as object 203, which now associates Caller id, Intent, and User Data. The next step is interaction with routing intelligence to determine where to route the call; that is, to which agent, live or automatic, the call should be routed for best service. Functions of Router 120 in this example are accessed, using the already attached information, to determine an agent. The caller's intent is, of course, paramount in this decision, and the User Data attached may also figure prominently in determination of a routing destination. The system maintains near real-time knowledge of which agents are on duty and available, which are engaged currently in live calls, which are engaged in non-call tasks, and which agents are open to receive a new call at the time the incoming call is ready to route. Functions of the router may take all of this and more into account, determine a destination for the call, and connect the call to the selected agent at the agent's workstation. The skilled person will understand the queueing may be involved in an efficient process of connecting calls to agents. That is, there may not be an agent at this time both free to take the call and having the requisite skills. In which case the caller may be placed on hold for a proper agent to become free to take the call, or may be offered a call-back. The skilled person will understand that in the connection of the example call to an agent, and in interaction of the live call, other systems at the contact center, such as media servers, may be accessed to establish and conduct the interaction between the caller and the agent.

Once the call is connected to the selected agent a live interaction object 204 results, which has all four categories of data associated. This object may be maintained in the dB for various purposes, one of which is to keep track of activities of the agents currently involved in the contact center. This object is also useful later, and may be associated with a partial or complete recording of the live call, which has many uses, such as reviewing an agent's performance. And after the live call is competed, more data may be attached, such as a recording of the call, time of the call, effective outcome, and so on.

A Virtual Interaction

Figure 3:
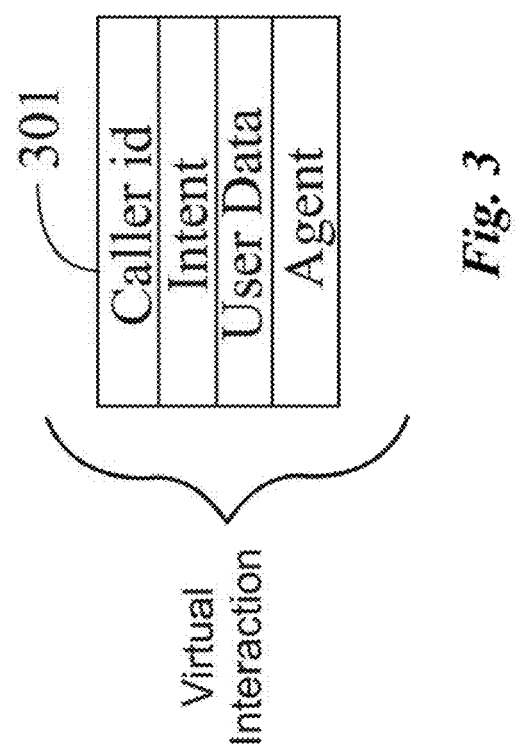
FIG. 3 illustrates a Virtual Interaction in one embodiment of the invention.

FIG. 3 illustrates a virtual interaction (VI) 301, an object of importance in the present invention, which in several ways is very much like interaction object 204 of FIG. 2. VI 301 includes a Caller id, which may include the caller's telephone number, but may also in some embodiments include destinations addresses and numbers for a caller at a plurality of destinations, such as land-line, cellular number, Skype handle, and other potential destinations. There is also an Intent associated in the VI, User data for the caller, and an agent id, which may also include telephone, text, chat, or other potential destinations for the agent. Depending on the particular circumstance, these fields of a VI could be either (partially) filled in, or just empty placeholders.

An essential difference between VI 301 and live interaction object 204 is that VI 301 is not developed from a live call and the call-processing and routing functionality of the contact center and its servers and software in populating and routing the live call. In a main use case a VI is populated in expectation, prediction or hope of a future live interaction. VIs, however, have other uses in other embodiments of the invention. For example, for outbound projects, which is similar to callback. For each OB or CB attempt one can create a VI with prefilled data (customer, interaction specifics), collect related info such as history and pre-reserve an agent. There are further VI use cases which are not driven by expected interactions, such as filling slots for agent surplus scenarios when more agents are on service than expected/predicted traffic. For those scenarios VIs can be used for e.g. synthetic interactions, or processing backlogs etc.

The skilled person will understand that the processes depicted by FIG. 2 in the development of object 204 each take time. In particular, there are two functions that may require a considerable span of time. One is the IVR interaction, in which the caller may be queried as to intent and expectation, and the other is in the actual routing, which in some cases, parks a caller in a queue (on hold). There are other latency issues as well. An important motivation in the concept and uses of VIs is to reduce the requirement for computer power, and also to connect and service callers more quickly. And there are other uses for VIs beyond these two purposes, which will be described in more enabling detail below.

Development of a Virtual Interaction

Figure 4:
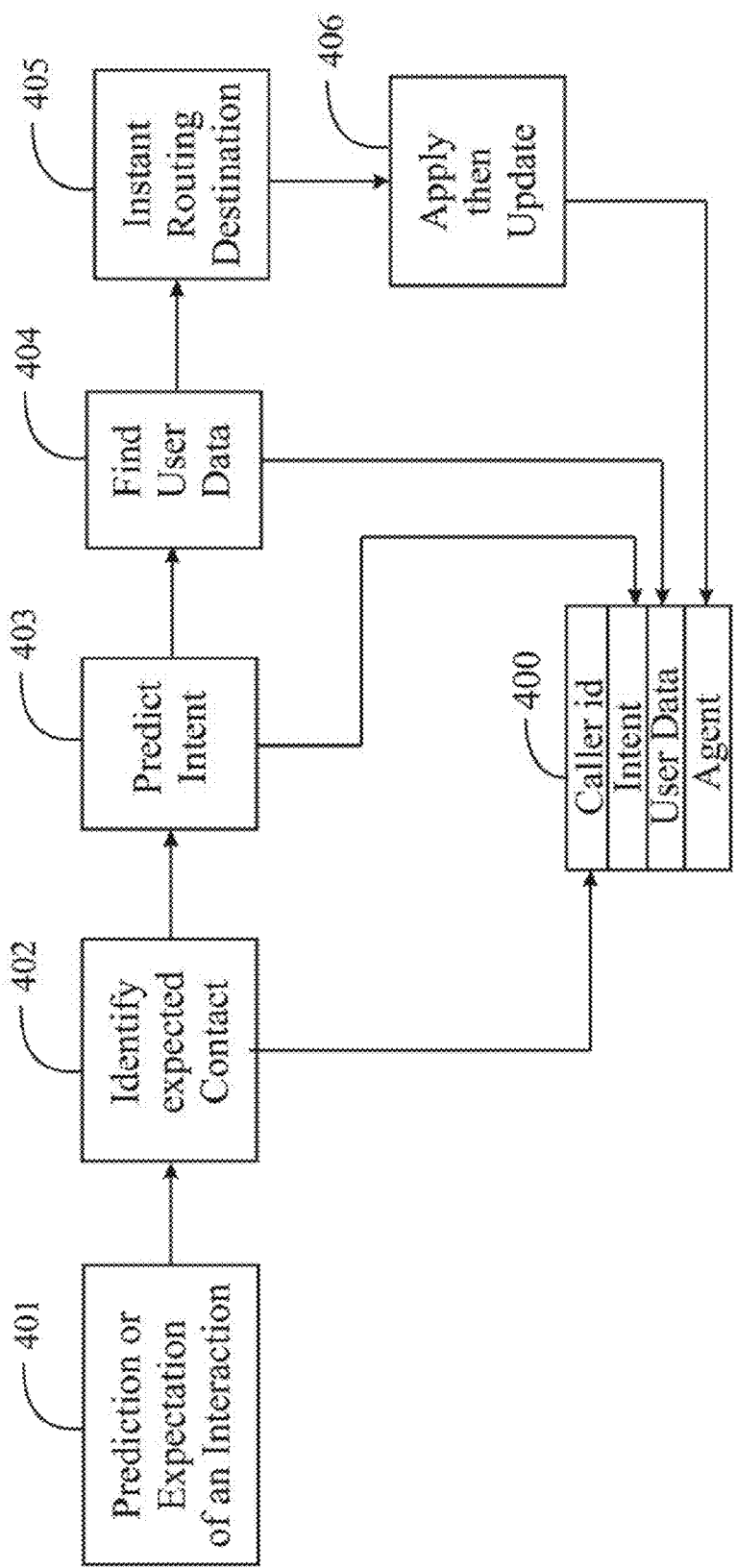
FIG. 4 illustrates an example process in development of a Virtual Interaction.

FIG. 4 is a flow diagram illustrating operation of VI Server 134 executing SW 135, in concert with other functionality of contact center 115, in creating a VI in one embodiment of the invention. At step 401 the system makes a prediction of an interaction. This may be done in any one of several ways. As a first example, a customer may have mentioned to an agent in a previous, concluded interaction, that the customer would call back at or near a certain time and date. In one embodiment of the invention a function of the agent's desktop might be to enable the agent to initiate a VI for the expected call, by entering the expected time, date, and the customer's id, and possibly an intent for the expected call as well.

As a second example of prediction for creating a VI, in one embodiment of the invention customers of the contact center may be informed and enabled to initiate a VI through an interactive interface on a website hosted by the enterprise for whom the call center operates. Frequent callers would know that they will be very efficiently connected with a best agent by this prior step. In the setup, the customer may also enter intent for the upcoming interaction. The caller in this operation will not be aware that a VI is being created, but will be aware that entry of the information will enhance later service.

As a third example, the enterprise may track customer behavior on a web site, and may determine through the customer's activity that the customer may highly likely initiate an interaction. In this example, the customer's activity on the site may also determine intent for an expected interaction.

As yet another example, certain customers of an enterprise may be known by experience to initiate an interaction with the contact center repeatedly at a certain time of day. As yet another example, a customer who has initiated a transaction, and perhaps has been frustrated in making connection with a helpful agent, may be informed that a call back at a certain time, or in five minutes, for example, will result in almost instant service. A VI may be prepared for that second call to treat the frustration of the customer.

There may be other ways to make the prediction for which a VI may be prepared. At step 402 for a predicted call, id is determined and entered into a developing VI 400. At step 403 intent for the predicted call is determined and entered into developing VI 400. In some cases, the intent may have been determined already at this point, as indicated in examples above. At step 404 the system finds and enters user data which may be useful in consummating a later interaction. This user data will be accessible for an agent to leverage once a VI becomes a live interaction. At step 405 the system determines an agent destination for the VI just as would be done for a developing real interaction (see FIG. 2).

The routing destination for a VI may not be specific at the time of developing the VI, as agent utilization is such that a specific agent selected in the VI development as a best agent for a live interaction stemming from a developed VI, will not in all probability be free to take the live call at the time the VI becomes a live interaction. In consequence, in one embodiment the routing function for a VI is a focusing function. That is, in many contact centers, agent capabilities are known, agent break times are known, and agents may be categorized in language capabilities, specific subject matter abilities, and so on. For VI development a short list of best agents may be associated with a VI, based on requirements, such as intent, language, subject matter and so on. Then, if and when the VI becomes a live call, the agent destination is at least narrowed, and a best agent may be selected from the short list.

In another embodiment the routing function initiated at step 405 is applied, selecting one best agent, which will work if the VI becomes a live interaction in short order. But Vis in many embodiments are time related, having a start time, and a lifetime, after which, if unused, a VI may be deleted. In one embodiment, after a short time after a first routing, the VI is re-routed, and this process may be repeated, shown as step 406, until the VI becomes a live interaction, or expires.

Uses of Virtual Interactions

Quick Enablement of Real Interactions

Once VI 400 is populated, it may be saved for future use to meld with an incoming interaction that is determined to be the expected interaction. The skilled person will understand that even in a saved state, a VI may be periodically updated as new data becomes available, deleted if knowledge is found that the expected call will not materialize, and routing may be regularly updated as described above. In some embodiments incoming calls are matched with VIs to determine and retrieve VIs to be used as real interactions.

When an incoming interaction is determined to match a previously created and stored VI, the VI may be retrieved, and used to complete the call. The process is much quicker and less computer intensive than conventional development of the real interaction, because at least some processes that would be necessary for the real interaction are already accomplished for the VI.

Referring again to FIG. 2, which shows the processes in the development of a live interaction object, if a call is received that is quickly determined to be an expected call for which a VI has been prepared, and especially if the routing has been kept up to date, the VI may be directly initiated as a live interaction, skipping essentially all of the processes of FIG. 2 in the development of a live interaction. The live call may be directly connected to the best agent, and there will be no discernable delay for the caller.

Figure 5:
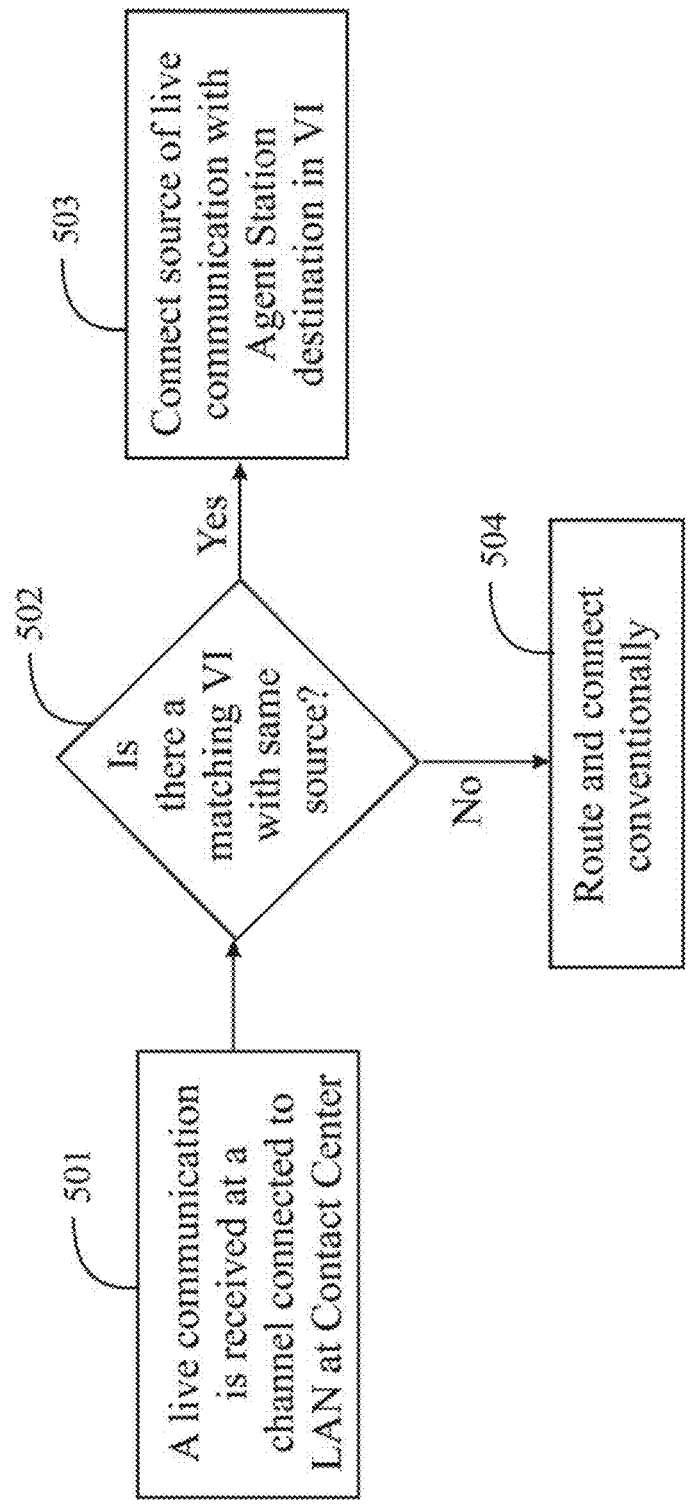
FIG. 5 is a flow diagram illustrating operation in an embodiment of the invention.

FIG. 5 is a flow diagram illustrating operation of a contact center for processing incoming communications according to an embodiment of the invention. FIG. 5 assumes that there is a Virtual Interaction Server in use in the contact center, and the VIs are stored and searchable. At step 501 a live interaction is received on a channel connected to the LAN of the contact center. For every communication received a search is made for a matching VI expecting the incoming communication at step 502. If a matching VI is found at step 503, the incoming communication is quickly connected to the agent station destination associated in the VI, and the VI becomes a live interaction. There is no need for IVR, data lookup, or routing intelligence, so considerable computer power is conserved, time is saved, and the caller may be amazed at being so quickly connected to a best agent.

Agent Skill Evaluation

In one embodiment of the invention VIs may be created with simulated interactions and used to model agent skills. In this case there is no real caller id and no expected call, although the intent a customer data may be real enough. In this embodiment Vis are routed to agents, perhaps randomly. As just a gross example, a VI may be in a particular language, and if the agent to whom it is routed responds well, that agent may be marked as qualified for that language. Such Vis may be much more sophisticated, leveraging subject matters with test sequences that will reveal an agent's competency or skill level in certain circumstances. Campaigns may be periodically executed to update agent skill evaluation. Another example is a synthetic interaction on a subject which was learned from the web or social media which might become relevant for a given business, and one would like to check proactively whether there are already agents knowledgeable in the subject. The subject itself might not be explicitly configured as skill yet, but synthetic interactions could be used for skill discovery.

Agent Performance Evaluation

In some embodiments Vis may be created to test agent's performance in specific situations and circumstances. Caller side behavior may be scripted as varied and stressful, for example, to test how an agent performs under stressful circumstances. Records may be kept, recorded and performance reports created and distributed.

Agent Training

In some embodiment VIs may be created and routed to agents for training purposes, including training on potential new subjects. This may motivate agents to get familiar with the subject. Such VIs may be grouped into categories and escalatory in nature, so training begins at a somewhat sophomoric level, and increases with further VIs that are more challenging.

Call-Back/Outbound Management

VIs are useful for call-back and for Outbound management in general, and may be created through a function of an agent's desktop application, or by a separate server handling call back or outbound traffic. Whenever a call-back is needed, whether through an agent initiation of a caller, the intent will generally be known, as well as the caller (to be called) id and the user data for an agent's use. In the case of Outbound campaigns the destinations are also known. The routing function is different than shown in FIG. 4, as the agent is known and a call will be placed to the caller id.

Back-Office Tasks

VIs may be useful for creating and managing distribution of non-call tasks for agents, having to do with many functions as are known in contact center operations.

A Self-Organizing Contact Center

In one embodiment of the invention the concept of VIs as described above may allow for a self-organizing contact center.

Using the concept of Virtual Interactions an end-to-end model of a self-driving contact center may be defined and implemented. Such a self-driving center would use only an absolutely minimum set of the most basic input elements, such as Agent List, Schedule templates (could be a function of Legal/Geo), optimization target, such as First Call Resolution (FCR) and Subject Area. Then the system will intelligently run the entire operation using VIs.

a. In case of crowd-sourcing, Agent list may not even be required b. Subject Area could also be intelligently derived and/or improved with time, based on interaction history. However, suggesting the initial subject area will help to accelerate the initial orientation by narrowing down the field of attention to the external context and suggested agent skills. E.g. (subect_area='retail-tech') will imply skills:={sales; support; billing; general} and channels: ={voice; chat; email; social}.

c. Such a "Black Box" Contact Center (further—BBCC) could begin operating with minimum required input and optimization targets (e.g. Agent list, schedule=24× 7, Subject_Area:='online-retail-tech', Geo area: ={'USA', 'Canada'}; Optimization:='Maximize FCR'). At the very beginning BBCC might start using VIs for intense training and testing, which will assign attributes, skills, and proficiency to Agents. After a reasonable warm-up period it will use predictive routing and journey analytics; for instance, it may start from T=0 as a random interaction distributor blended with training and qualifications synthetic interactions, and, with time will optimize the fulfillment of the VI stream relying on feeds from the outside world and accumulating interaction history, as well as, assigned agent attributes and qualifications.

d. Going further, a proactive real-time recruiting function might be added, which could control the talent demand and bidding offering different rates, depending on the fulfillment patterns at different times.

Virtual Interaction Reporting and Feedback

A very important component of a contact center is an ability to track activity and operations, to render the data in a useful manner, and to feedback to knowledge workers and administrative staff reports of performance against expectations, which enables strategic planning and developmental improvements in operations. This, of course, is a software function, and may be accomplished by executing the software, comprising algorithms for data collection, analysis and reporting, on one or more processors of one or more servers in the contact center. In FIG. 1 Stat Server 124 is a good candidate for tracking and reporting, because much of this sort of data management is a part of the functionality of a Statistics server. But such functions may occur elsewhere in the contact center as well, or be shared among two or more servers.

Reports may be of several sorts. Some reporting may be done on a more-or-less continuous basis. Call load, as one example, is almost always tracked, and may be reported to personnel needing to know in several ways. Other reports may be generated on longer periods, and may be published in different ways. In contact centers practicing embodiments of the present invention, involving creation and use of VIs in a variety of applications, the activities involving VIs need to be tracked, recorded, and reported, to best be able to operate to maximum effect in those applications using VIs.

In one commercially available contact center system known to the inventors, work-force management (WFM) is a quite highly developed practice, wherein a great variety of activities of the contact center are tracked, data is processed, and reports are displayed and provided in other ways to interested and responsible parties in the contact center. In embodiments of the present invention, involving VIs, the WFM operations of the contact center are enhanced relative to use of VIs.

In one aspect of WFM in an embodiment of the invention statistics are tracked and recorded for:

numbers of VIs created in expectation of live interactions sources of expectation portion of created VIs that convert successfully to live interactions instances of successful VIs that required alteration in transition unexpected variation of rate of expectations and VI creation Inventory of training and testing VIs by type These are simply examples of stats that may be tracked and processed for VIs, and there may be many more that may be useful in work-force management. IN a sophisticated WFM environment there will be a dashboard with drop-down menus for displaying processed data, and for commanding certain processing and alternative displays. The feedback loop of processed statistics regarding VIs may be used for adjusting prediction algorithms, correcting staffing levels, focusing training through VIs, determining advantageous periods for training and evaluation, and for many other purposes.

It will be apparent to the skilled person that the embodiments described above are examples of practice of the invention in various aspects, and are not therefore limiting to the scope of the invention, which may include many other manifestations of the invention and ways of practicing the invention. The architecture of a contact center may, for example, take many other forms than those described, and functions in the invention may be done somewhat differently and in a different order than the specific examples described. It was described above, for example, with reference to FIG. 1, that Contact center 115 may represent one of a plurality of federated contact centers, a single center hosted by a single enterprise, a single contact center operating on behalf of a plurality of host enterprises, or any one of a variety of other arrangements. The VI mechanisms in such cases would be adapted to specifics of the Contact Center arrangement. For example, for a Business Process Outsourcing type contact center serving multiple tenants one could use VIs per tenant if agents are dedicated, or common VIs at contact center level if agents are shared. The scope of the invention is limited only by the claims that follow.

The invention claimed is:

1. A contact center system, comprising:
    processor; and
    memory, wherein the memory has stored therein instructions that, when executed by the processor, cause the processor to:
        create a virtual interaction object based on an expected receipt of a future communication from a source;
        store the virtual interaction object in association with the source;
        detect an incoming communication from the source;
        match the incoming communication to the stored virtual interaction object;
        convert the virtual interaction object to a live interaction object in response to the match; and
        transmit a signal to route the incoming communication to a destination.

2. The contact center system of claim 1, wherein the virtual interaction object is stored in association with at least one of a time of creation, time of life, or time to expire.

3. The contact center system of claim 1, wherein the destination is determined at a time of creation of the virtual interaction object, and stored in association with the virtual interaction object.

4. The contact center system of claim 1, wherein the instructions further cause the processor to track a number of virtual interaction objects created for the contact center, and a number of convertions of the virtual interaction objects to live interactions.

5. The contact center system of claim 1, wherein the expected receipt of the future communication is based on determining an anticipated intent for the future communication, wherein the instructons further cause the processor to store the anticipated intent in association with the virtual interaction object.

6. The contact center system of claim 1, wherein the expected receipt of the future communication is based on tracking browsing behavior on a web site associated with the contact center system.

7. The contact center system of claim 1, wherein the expected receipt of the future communication is based receipt of communication indicative of an intent to initiate the future communication.

8. The contact center system of claim 1, wherein the instructions further cause the processor to:
    create a second virtual interaction object for training agents based on a pre-planned interaction associated with the virtual interaction object.

9. The contact center system of claim 1, wherein the instructions further cause the processor to store results of the interaction in association with the live interaction object.

10. A method, comprising:
    creating, by a processor, a virtual interaction object based on an expected receipt of a future communication from a source;
    storing, by the processor, the virtual interaction object in association with the source;
    detecting, by the processor, an incoming communication from the source;
    matching, by the processor, the incoming communication to the stored virtual interaction object;
    converting, by the processor, the virtual interaction object to a live interaction object in response to the match; and
    transmitting, by the processor, a signal to route the incoming communication to a destination.

11. The method of claim 10, wherein the virtual interaction object is stored in association with at least one of a time of creation, time of life, or time to expire.

12. The method of claim 10, wherein the destination is determined at a time of creation of the virtual interaction object, and stored in association with the virtual interaction object.

13. The method of claim 10, further comprising tracking a number of virtual interaction objects created for the contact center, and a number of convertions of the virtual interaction objects to live interactions.

14. The method of claim 10, wherein the expected receipt of the future communication is based on determining an anticipated intent for the future communication, wherein the instructons further cause the processor to store the anticipated intent in association with the virtual interaction object.

15. The method of claim 10, wherein the expected receipt of the future communication is based on tracking browsing behavior on a web site associated with the contact center system.

16. The method of claim 10, wherein the expected receipt of the future communication is based receipt of communication indicative of an intent to initiate the future communication.

17. The method of claim 10, further comprising:
    creating, by the processor, a second virtual interaction object for training agents based on a pre-planned interaction associated with the virtual interaction object.

18. The method of claim 10, further comprising:
storing results of the interaction in association with the live interaction object.

\* \* \* \* \*